(12) United States Patent
Hong et al.

(10) Patent No.: US 10,550,976 B2
(45) Date of Patent: Feb. 4, 2020

(54) HIGH-PRESSURE TOLERANT INTEGRATED LEAKAGE-PROOF SLEEVE COMPENSATOR

(71) Applicant: Lei Hong, Jiangsu (CN)

(72) Inventors: Liang Hong, Taizhou (CN); Aichun Zhu, Taizhou (CN); Guangjin Cao, Taizhou (CN); Minghua Yin, Taizhou (CN)

(73) Assignee: JIANGSU BEITE PIPE FITTINGS CO., LTD., Jiangyan, Jiangsu (CN)

( * ) Notice: Subject to any disclaimer, the term of this patent is extended or adjusted under 35 U.S.C. 154(b) by 256 days.

(21) Appl. No.: 15/316,521

(22) PCT Filed: Oct. 11, 2014

(86) PCT No.: PCT/CN2014/088349
§ 371 (c)(1),
(2) Date: Dec. 6, 2016

(87) PCT Pub. No.: WO2015/184717
PCT Pub. Date: Dec. 10, 2015

(65) Prior Publication Data
US 2018/0224033 A1  Aug. 9, 2018

(30) Foreign Application Priority Data
Jun. 6, 2014 (CN) .......................... 2014 1 0249660

(51) Int. Cl.
*F16L 27/12* (2006.01)
*F16L 51/00* (2006.01)
(Continued)

(52) U.S. Cl.
CPC ............. *F16L 27/125* (2013.01); *F16L 21/04* (2013.01); *F16L 51/00* (2013.01); *F16L 27/067* (2013.01); *F16L 57/06* (2013.01)

(58) Field of Classification Search
CPC ....... F16L 27/12; F16L 27/125; F16L 27/067; F16L 51/00; F16L 21/04; F16L 57/06
(Continued)

(56) References Cited

U.S. PATENT DOCUMENTS 1,868,014 A * 7/1932 Lucas ..................... F16L 27/12
285/368 X
2,148,038 A * 2/1939 Raybould ............... F16L 21/04
285/374 X (Continued)

FOREIGN PATENT DOCUMENTS

| CN | 2766133 | 3/2006 |
|---|---|---|
| CN | 201348113 | 11/2009 |

(Continued)

*Primary Examiner* — Zachary T Dragicevich
(74) *Attorney, Agent, or Firm* — Treasure IP Group, LLC

(57) ABSTRACT

A high-pressure tolerant integrated leakage-proof sleeve compensator, comprising an inner pipe (1), a connection pipe (9), an outer sleeve (4) sleeved on the inner pipe, and a filler flange (3), one end of the filler flange extends into the outer sleeve, and the inner surface of the outer sleeve is provided with an annular inner boss (7); a sealing filler (5) is provided between the annular inner boss and the end of the filler flange extending into the outer sleeve; the outer surface of the inner pipe is provided with an annular outer boss (8), constituting an axially limiting structure of the inner pipe; the filler flange is connected to the outer sleeve via a fastener (2), the connection pipe and the outer sleeve are a unitary structure integrally formed; an anti-impact plate (14) is arranged between the sealing filler and the annular inner boss.

6 Claims, 5 Drawing Sheets

(51) Int. Cl.
*F16L 21/04* (2006.01)
*F16L 27/067* (2006.01)
*F16L 57/06* (2006.01)

(58) Field of Classification Search
USPC .............. 285/114, 115, 267, 337, 368, 374
See application file for complete search history.

(56) References Cited

U.S. PATENT DOCUMENTS

| | | | |
|---|---|---|---|
| 4,457,523 A * | 7/1984 | Halling | |
| 6,538,198 B1 * | 3/2003 | Wooters | |
| 7,891,711 B2 * | 2/2011 | Song | F16L 27/125 |
| | | | 285/374 X |
| 8,573,654 B2 * | 11/2013 | Kishi | F16L 21/04 |
| | | | 285/374 |

FOREIGN PATENT DOCUMENTS

| | | |
|---|---|---|
| CN | 201748098 | 2/2011 |
| CN | 201748100 | 2/2011 |
| CN | 102062274 | 5/2011 |
| CN | 201851831 | 6/2011 |
| CN | 201884859 | 6/2011 |
| CN | 102330859 | 7/2011 |
| CN | 203500749 | 3/2014 |
| CN | 103994296 | 8/2014 |
| DE | 202005012296 | 11/2005 |
| FR | 2272324 | 1/1976 |

* cited by examiner

Prior art

HIGH-PRESSURE TOLERANT INTEGRATED LEAKAGE-PROOF SLEEVE COMPENSATOR

BACKGROUND OF THE INVENTION

1. Technical Field

The present invention relates to a high-pressure resistant integrated leak-free sleeve compensator.

2. Description of Related Art

Pipes used in the electric, petroleum, chemical and thermal power industries, etc. usually need to be equipped with compensation devices. Existing compensation devices include rotary compensators, ripple compensators, sleeve compensators, spherical compensators, etc., which are used for compensating for the axial and radial displacement of pipes. When high-temperature and high-pressure media are delivered in the pipes, high requirements are imposed on rotary compensators, including sufficient displacement compensation, good sealing performance and longer service life.

Outer sleeves and connecting pipes of existing sleeve compensators are all integrally butt-jointed by welding (refer to FIG. 1). Through study, the applicant found that such butt-welding mode inevitably results in partial overlapping of an annular weld, between an outer sleeve and the connecting pipe, with an inner pipe, and it is difficult to accurately detect the welding quality by means of non-destructive detection using X rays, etc., thus there is no guarantee to the weld quality. For this reason, a related national standard GB/T150.4-2011 specifies that "For the last annular closed welding of a cylinder, with an inner diameter not exceeding 800 mm, and an end socket, a single-face welding butt-joint without a cushion shall be used, and when X-ray or ultrasonic testing fails, it is allowed to save the testing, but gas protective welding for priming is needed." The national standard has regulations on the welding process of the outer sleeve and the connecting pipe, but the welding quality of the outer sleeve and the connecting pipe still cannot be ensured. When a rotary compensator is applied to a high-temperature and high-pressure pipe, the quality has a direct relationship with human safety.

Through study, the applicant also found that the sleeve compensator needs to work for a long time after being installed in a pipe and that its maximum service time can reach 30 years. During long-time use, the sealing filler between the outer sleeve and the inner pipe has losses (more obvious when the delivered media are high-temperature and high-pressure media) after the long-term impact by the delivered media, resulting in a decline in the sealing effect or malfunction, thus affecting the sealing performance of the whole sleeve compensator.

Through study, the applicant also found that the sleeve compensator needs to work for a long time after being installed in a pipe and that its maximum service time can reach 30 years. During long-time use, the sealing filler between the outer sleeve and the inner pipe has losses (more obvious when the delivered media are high-temperature and high-pressure media) due to the movement of the inner pipe relative to the outer sleeve, resulting in a decline in the sealing effect or malfunction, thus affecting the sealing performance of the whole rotary compensator.

Therefore, thoroughly eliminating the potential safety hazards of the sleeve compensator caused by butt-welding of the outer sleeve and the connecting pipe, solving the problem of a decline in sealing effect or malfunction caused by losses of the sealing filler between the outer sleeve and the inner pipe after long-term impact by the delivered media, which affects the sealing performance of the whole rotary compensator, and solving the problem of decline in the sealing effect or malfunction caused by losses of the sealing filler due to the movement of the inner pipe relative to the outer sleeve, which affects the sealing performance of the whole rotary compensator, are key objectives of those skilled in this field.

SUMMARY OF THE INVENTION

The present invention mainly solves the following technical problems:

1. Potential safety hazards are caused by butt-welding of outer sleeves and connecting pipes of the existing pipe sleeve compensators.

2. During long-term use of the sleeve compensator, losses of the sealing filler between the outer sleeve and the inner pipe caused by the long-term impact by the delivered media result in a decline in the sealing effect or malfunction, thus affecting the sealing performance of the whole rotary compensator.

3. Losses of the sealing filler caused by the movement of the inner pipe relative to the outer sleeve result in a decline in the sealing effect or malfunction, thus affecting the sealing performance of the whole sleeve compensator.

To solve the above technical problems, the present invention employs the following technical solution:

A high-pressure resistant integrated leak-free sleeve compensator consists of an inner pipe, a connecting pipe, an outer sleeve sleeved on the inner pipe and a filler flange. One end of the filler flange extends into the outer sleeve. The outer sleeve has an inner surface provided with an annular inner boss. Sealing filler is disposed between the annular inner boss and one end of the filler flange extending into the outer sleeve. The inner pipe has an outer surface provided with an annular inner boss to form an axial limit structure of the inner pipe. The filler flange and the outer sleeve are connected via a fastener. The connecting pipe and the outer sleeve are integrally molded to form an integrated structure. An anti-impact plate is disposed between the sealing filler and the annular inner boss. Wear-resistant carbon fiber layers are respectively disposed between the sealing filler and the outer surface of the inner pipe and between the sealing filler and the inner surface of the outer sleeve.

In order to avoid gaps generated due to normal wearing after long-term use of the sealing filler from affecting the sealing performance of the whole sleeve compensator, the filler flange is also provided with a compression flange on the outer side. Springs in an axial array are uniformly distributed, along the same circumference, between the compression flange and the filler flange. The compression flange, the filler flange and the outer sleeve are connected by a fastener.

In order to avoid gaps generated due to normal wearing after long-term use of the sealing filler from affecting the sealing performance of the whole sleeve compensator, the outer sleeve can be provided with a stuffing filling device.

In order to improve the movement guide performance of the inner pipe of the sleeve compensator, obviously enhance the stability of the inner pipe during movement relative to the outer sleeve, and prevent the inner pipe from being laterally worn, the inner pipe has two annular outer bosses, and the interval between the two annular outer bosses is 1.5 times the width of a single annular outer boss.

In order to ensure the impact resistance of the anti-impact plate, the inner diameter of the anti-impact plate is 1-0.5 mm greater than the outer diameter of the inner pipe, and the outer diameter thereof is 1-0.5 mm smaller than the inner diameter of the outer sleeve.

For convenient connection with pipes with different apertures, the connecting pipe is a reducer pipe.

The present invention achieves the following technical progress:

1. The outer sleeve and the connecting pipe are integrally molded to form an integrated structure, so the product does not need radiographic inspection, thoroughly solving the problems of difficult operation of weld flaw detection and even failure to perform the detection caused by the existing welding mode, improving product quality and safety, saving production cost, and enhancing productivity of products.

2. The wearing of the sealing filler caused by the relative rotation of the outer sleeve and the inner pipe can be effectively avoided by configuration of the wear-resistant carbon fiber layers between the sealing filler and the outer surface of the inner pipe and between the sealing filler and the inner surface of the outer sleeve, thus reducing the losses of the sealing materials and enhancing the sealing performance of the whole rotary compensator.

3. The configuration of the anti-impact plate can effectively avoid media from impacting the sealing filler, thus reducing losses of the sealing materials and further enhancing the sealing performance of the whole rotary compensator.

DETAILED DESCRIPTION OF THE INVENTION

Figure 1:
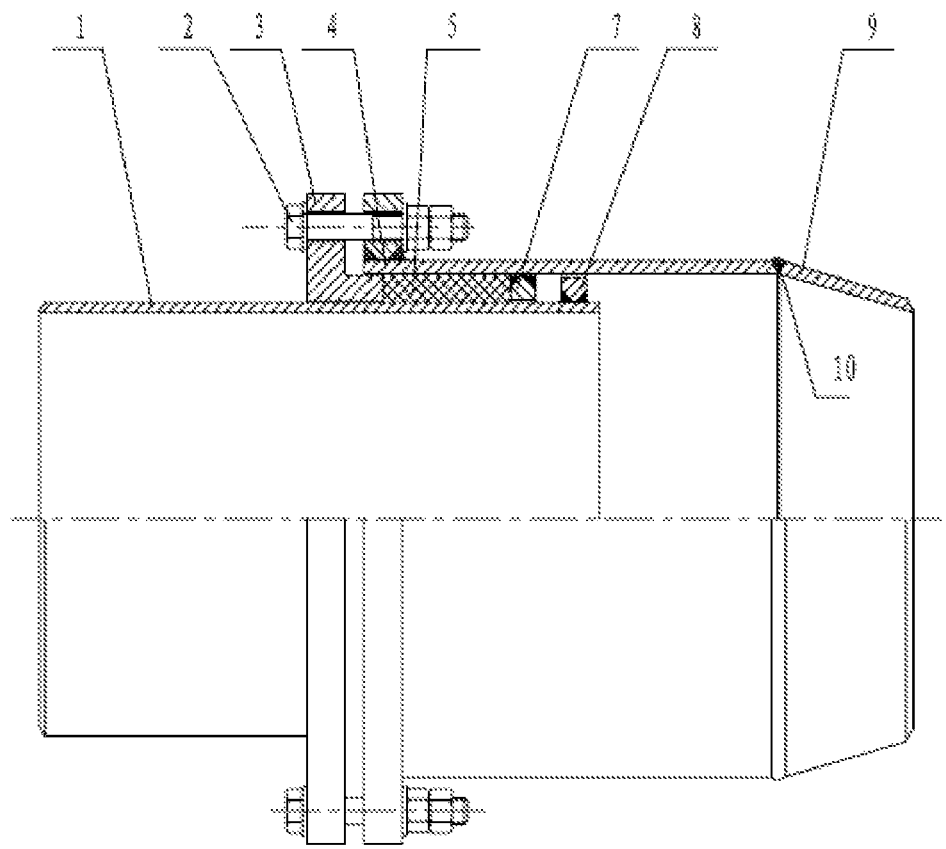
FIG. 1 is a structural view of the prior art.

In FIGS. 1-5, marks are as follows: inner pipe 1, fastener 2, filler flange 3, outer sleeve 4, sealing filler 5, stuffing filling device 6, annular inner boss 7, annular outer boss 8, connecting pipe 9, annular weld 10 for connecting the outer sleeve and the connecting pipe, annular outer boss 11, spring 12, compression flange 13, anti-impact plate 14, wear-resistant carbon fiber layer 15.

Embodiment 1

Figure 2:
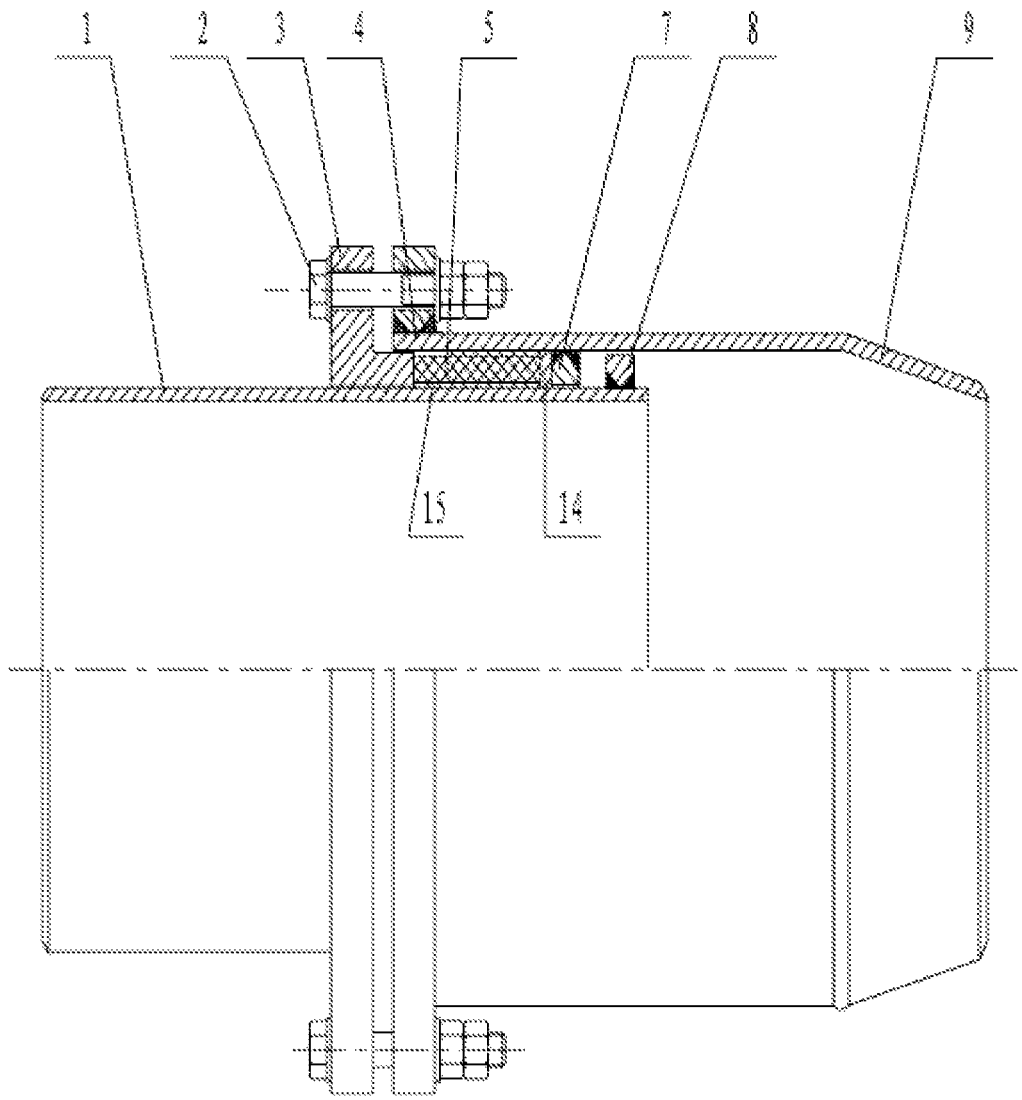
FIG. 2 is a structural view of embodiment 1 of the present invention.

As shown in FIG. 2, a high-pressure resistant integrated leak-free sleeve compensator of this embodiment includes an inner pipe 1, a connecting pipe 9, an outer sleeve 4 sleeved on the inner pipe 1 and a filler flange 3. The connecting pipe 9 is a reducer pipe, integrally molded with the outer sleeve 4 to form an integrated structure. One end of the filler flange 3 extends into the outer sleeve 4. The outer sleeve 4 has an inner surface provided with an annular inner boss 7. Sealing filler 5 is disposed between the annular inner boss 7 and one end of the filler flange 3 extending into the outer sleeve 4. An anti-impact plate 14 is disposed between the sealing filler 5 and the annular inner boss 7. Wear-resistant carbon fiber layers 15 are respectively disposed between the sealing filler 5 and the outer surface of the inner pipe 1 and between the sealing filler 5 and the inner surface of the outer sleeve 4. The inner pipe 1 has an outer surface provided with an annular outer boss 8, forming an axial limit structure of the inner pipe 1. The filler flange 3 and the outer sleeve 4 are connected through a fastener 2.

The inner diameter of the anti-impact plate 10 is 1-0.5 mm greater than the outer diameter of the inner pipe, and the outer diameter thereof is 1-0.5 mm smaller than the inner diameter of the outer sleeve.

Embodiment 2

Figure 3:
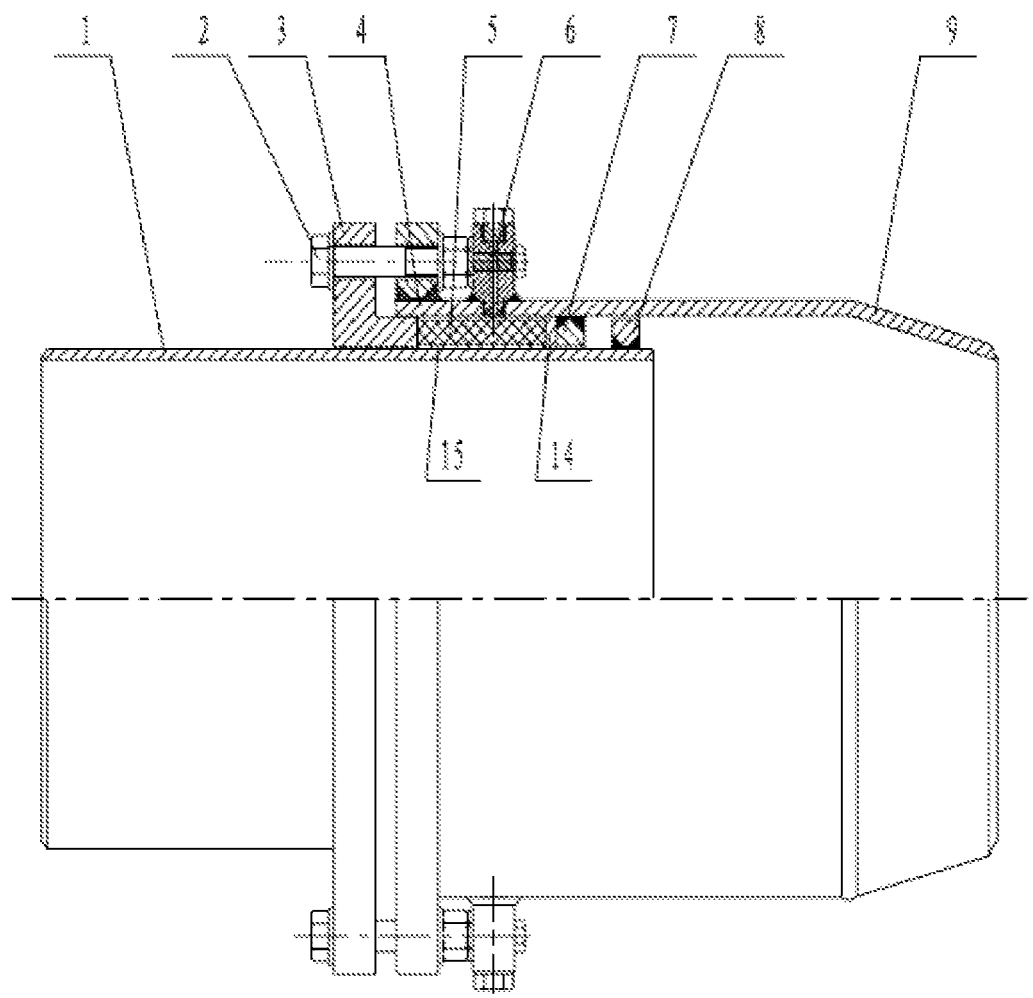
FIG. 3 is a structural view of embodiment 2 of the present invention.

As shown in FIG. 3, this embodiment is added with a stuffing filling device 6 on the basis of embodiment 1. The specific implementation mode is as follows: 4-30 filling openings are uniformly distributed along the same circumference at positions corresponding to the sealing filler on the outer sleeve 4; a radial through-hole disposed in each filling opening runs through a traverse hole of the waist of the corresponding filling opening; the radial through-hole is provided with a plug at its outer end; and a plug installed in the traverse hole runs through the radial through-hole to form the stuffing filling device 6 with a valve structure. During use of the sleeve compensator, if a leak occurs due to a decline in the sealing performance, the plug installed at the outer end of the filling opening and the plug in the traverse hole can be removed on line, and a pressure gun can be inserted into the filling opening to compensate the sealing filler. After the filling is completed, the plug installed in the transverse hole is fastened first; then, the pressure gun is removed; and next, the outer end of the filling opening is re-installed with the plug. In this way, the sealing performance of the sleeve compensator can be recovered in time by compensating the sealing filler on line.

The stuffing filling device is of a prior art.

Embodiment 3

Figure 4:
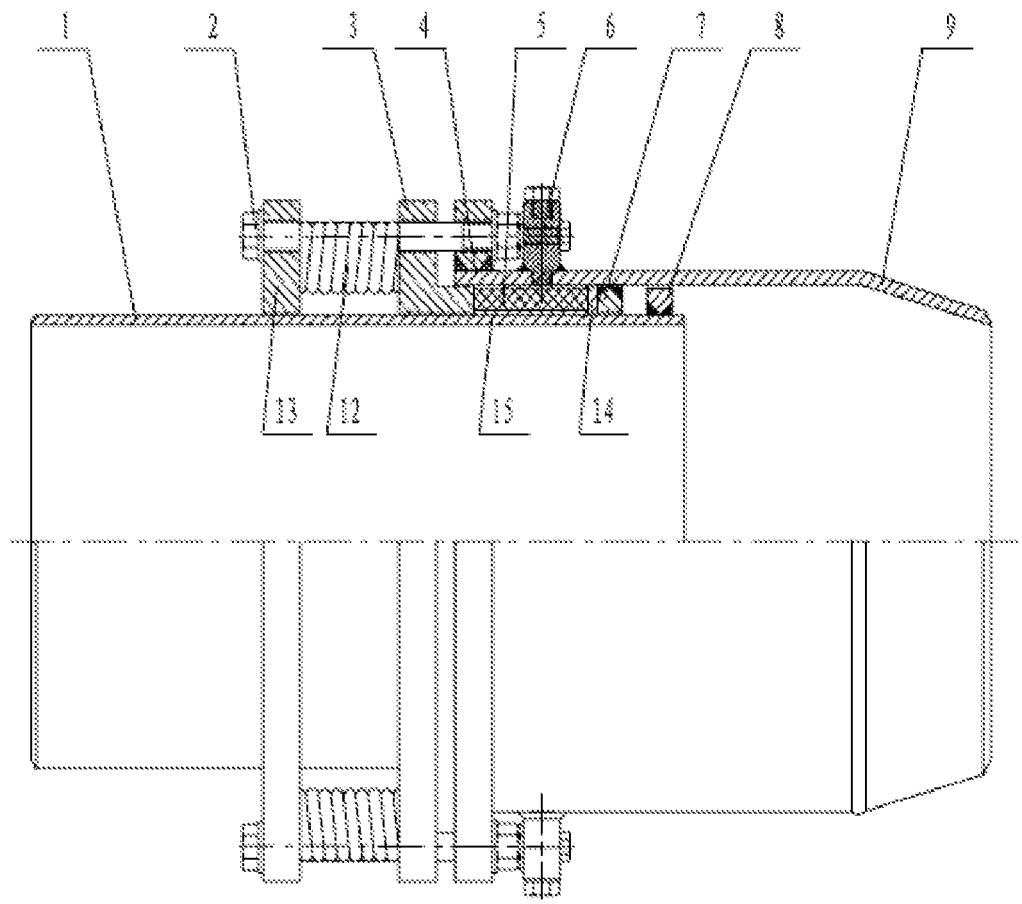
FIG. 4 is a structural view of embodiment 3 of the present invention.

As shown in FIG. 4, this embodiment is added with a compression flange 13 on the outer side of the filler flange on the basis of embodiment 2. Springs 12 in an axial array are uniformly distributed along the same circumference between the compression flange 13 and the filler flange 3. The compression flange 13, the filler flange 3 and the outer sleeve 4 are connected by a fastener 2.

In this embodiment, when the sleeve compensator is normal use, the springs 12 are in the compressed state. Thus, even if the sealing filler 5 is worn after long-time use, the sealing performance of the sleeve compensator does not decline after normal wearing of the sealing filler 5 because the elastic force of the springs 12 can push the filler flange 3 to continuously compress the sealing filler 5.

Embodiment 4

Figure 5:
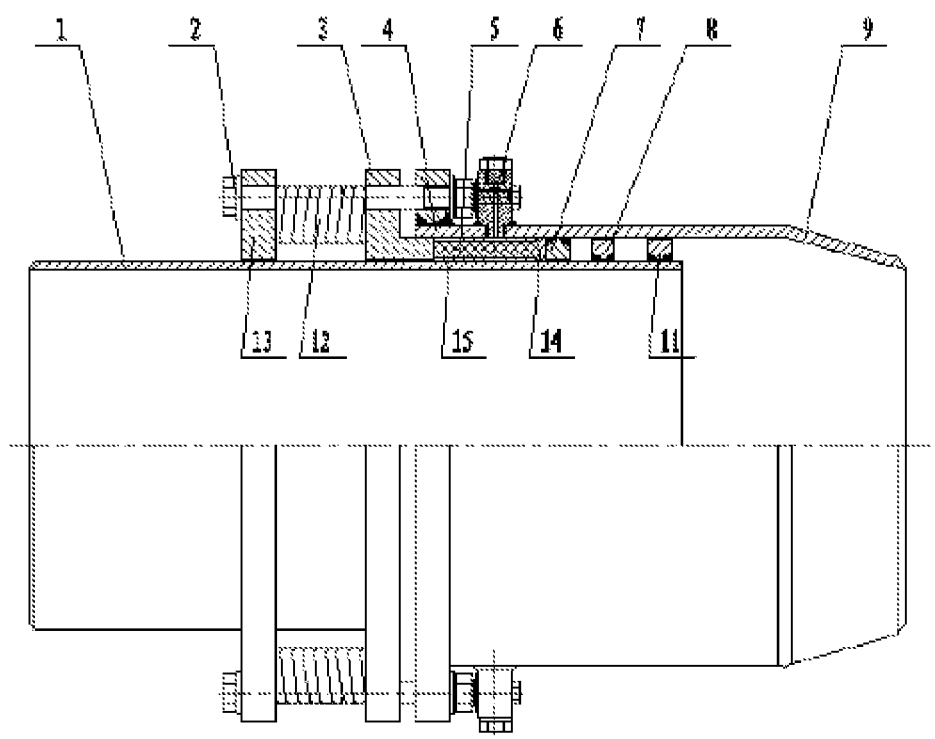
FIG. 5 is a structural view of embodiment 4 of the present invention.

As shown in FIG. 5, this embodiment is basically the same with embodiment 3 in structure, and is different in that the inner pipe has two annular outer bosses 8 and 11, wherein the interval between the two annular outer bosses is 1.5 times the width of a single annular outer boss. In this way, the fitting area between the inner pipe 1 and the outer sleeve 4 can be increased by 250% in comparison with a single annular inner boss, thus obviously improving the movement guide performance of the inner pipe 1 of the sleeve compensator, obviously enhancing the stability of the inner pipe 1 during movement relative to the outer sleeve 4, and preventing the inner pipe 1 from being laterally worn.

The invention claimed is:

1. An integrated high-pressure resistant leak-free sleeve compensator, comprising
    an inner pipe, a connecting pipe, an outer sleeve sleeved on the inner pipe and a filler flange, and;
    one end of the filler flange extending into the outer sleeve;
    the outer sleeve having an inner surface provided with an annular inner boss;
    sealing filler being disposed between the annular inner boss and one end of the filler flange extending into the outer sleeve, configured to avoid gaps between inner and outer pipes and is capable of being refilled through the filler flange;
    the inner pipe having an outer surface provided with an annular outer boss to form an axial limit structure for the inner pipe;
    the filler flange and the outer sleeve being connected via a fastener;
    characterized in that, the connecting pipe and the outer sleeve are integrally molded to form an integrated structure;
    an anti-impact plate is disposed between the sealing filler and the annular inner boss, configured to reduce loss of the sealing materials and enhance the sealing performance of the integrated high-pressure resistant leak-free sleeve compensator; and
    wear-resistant carbon fiber layers are respectively disposed between the sealing filler and the outer surface of the inner pipe and between the sealing filler and the inner surface of the outer sleeve,
    wherein the integrated high-pressure resistant leak-free sleeve compensator is a rotary compensator which allows relative rotation between the outer sleeve and the inner pipe.

2. The high-pressure resistant integrated leak-free sleeve compensator according to claim 1, characterized in that, the filler flange is also provided with a compression flange on the outer side; and springs in an axial array are uniformly distributed, along the same circumference, between compression flange and the filler flange; and the compression flange, the filler flange and the outer sleeve are connected by the fastener.

3. The high-pressure resistant integrated leak-free sleeve compensator according to claim 1, characterized in that, the outer sleeve is provided with a stuffing filling device.

4. The high-pressure resistant integrated leak-free sleeve compensator according to claim 1, characterized in that, the inner pipe has two annular outer bosses, and the interval between the two annular outer bosses is 1.5 times the width of a single annular outer boss.

5. The high-pressure resistant integrated leak-free sleeve compensator according to claim 1, characterized in that, the inner diameter of the anti-impact plate is 1-0.5 mm greater than the outer diameter of the inner pipe, and the outer diameter thereof is 1-0.5 mm smaller than the inner diameter of the outer sleeve.

6. The high-pressure resistant integrated leak-free sleeve compensator according to claim 1, characterized in that, the connecting pipe is a reducer pipe.

* * * * *